P. DAIMLER.
DRIVING GEAR FOR MOTOR CARS.
APPLICATION FILED OCT. 25, 1906.

963,874.

Patented July 12, 1910.

Witnesses:
Alfred Boshardt.
Stanley E. Bramall.

Inventor:
Paul Daimler.
Per L. Boshardt.
Attorney.

UNITED STATES PATENT OFFICE.

PAUL DAIMLER, OF UNTERTÜRKHEIM, GERMANY.

DRIVING-GEAR FOR MOTOR-CARS.

963,874.  Specification of Letters Patent.  Patented July 12, 1910.

Application filed October 25, 1906. Serial No. 340,550.

*To all whom it may concern:*

Be it known that I, PAUL DAIMLER, citizen of the Empire of Germany, residing at Untertürkheim, in the Kingdom of Würtemberg, Germany, have invented certain new and useful Improvements in Driving Slanted Wheels of Motor-Cars, of which the following is a specification, reference being had therein to the accompanying drawing.

This invention relates to improvements in that type of motor driven vehicles in which the driving wheels of the vehicle are driven by spur wheel gearing.

To enable of mounting such driving wheels at a slant it has hitherto been necessary to mount the respective shafts at a corresponding angle which entailed certain complications in the construction of the differential driving gear of the vehicle.

The object of this invention is to provide means whereby the said driving wheel shafts can be mounted in a straight line with each other and an ordinary construction of differential driving gear used, which entirely obviates the said defects.

Figure 1:
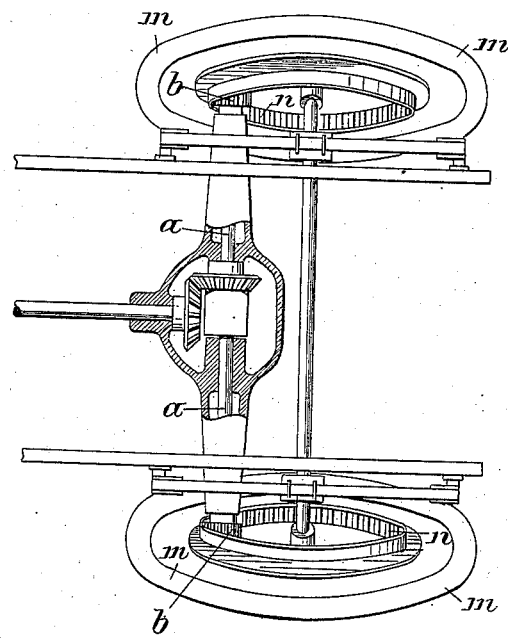
Figure 2:
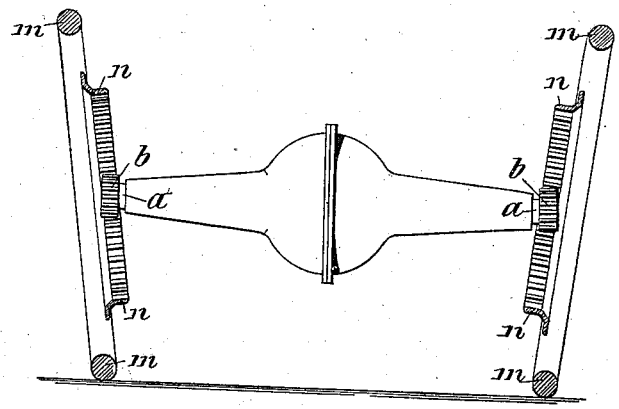

Figure 1 on annexed drawing is a plan of the back part of a motor vehicle frame inclusive of the two back wheels. Fig. 2 is a vertical section on line A—B of Fig. 1 as seen from the right.

Referring to the figures generally, $a$, $a$ are the two parts of the driving shaft arranged in a straight line with each other, the ends of which carry the driving spur pinions $b$ in gear with the internal wheels $n$ on the back wheels $m$, $m$. The latter are not arranged vertically but at a slant, that is to say, the planes thereof converge downward and as the shaft $a$ is horizontal and not vertical to the plane of the internal spur wheels $n$ it is impossible to use ordinary spur wheel gearing.

According to my invention the said difficulty is met by forming the spur pinions $b$ and the internal spur wheels $n$ according to the laws of hyperboloidal-paraboloidal gearing.

As it is a well known fact that two paraboloidal-hyperboloids of corresponding construction always touch each other along a straight generatrix, it will be clear that two circles of teeth the middle contact surfaces of which are formed after two paraboloidal hyperboloids in contact with each other will always remain faultlessly in gear.

The improved device described thus solves the problem of driving the slanted wheels of a motor vehicle by the parts of a shaft arranged as usual in a straight line which dispenses with the hitherto necessary and complicated device in which the two shaft halves are set at an angle.

I claim—

In a motor driven vehicle, driving shafts arranged in a straight line, a paraboloidal hyperboloidically toothed pinion secured on each of the said shafts, a driving axle, wheels mounted thereon at a slant and a paraboloidal hyperboloidically toothed internal wheel on each of the said driving wheels, in gear with the said pinions, all combined substantially as and for the purpose set forth.

In testimony whereof I hereunto affix my signature in presence of two witnesses.

PAUL DAIMLER.

Witnesses:
ROBERT UHLAN,
ERNST ENTENMANN.